United States Patent
Park et al.

(10) Patent No.: US 7,256,802 B2
(45) Date of Patent: Aug. 14, 2007

(54) LIQUID CRYSTAL DISPLAY MODULE AND LIQUID CRYSTAL DISPLAY APPARATUS HAVING THE SAME

(75) Inventors: Haeng-Won Park, Seongnam-si (KR); Jong-Seon Kim, Pyungtaek-si (KR)

(73) Assignee: Samsung Electronics Co., Ltd. (KR)

( * ) Notice: Subject to any disclaimer, the term of this patent is extended or adjusted under 35 U.S.C. 154(b) by 306 days.

(21) Appl. No.: 10/495,399

(22) PCT Filed: May 12, 2002

(86) PCT No.: PCT/KR02/00818

§ 371 (c)(1),
(2), (4) Date: May 12, 2004

(87) PCT Pub. No.: WO03/056663

PCT Pub. Date: Jul. 10, 2003

(65) Prior Publication Data

US 2004/0257319 A1 Dec. 23, 2004

(30) Foreign Application Priority Data

Dec. 26, 2001 (KR) .............................. 2001-84860

(51) Int. Cl.
*G09G 3/36* (2006.01)
*G09G 5/00* (2006.01)
(52) U.S. Cl. .................... 345/903; 345/87; 345/204; 345/211
(58) Field of Classification Search ........ 345/204–214, 345/55–100, 156–184, 903, 905
See application file for complete search history.

(56) References Cited

U.S. PATENT DOCUMENTS

| 2001/0004257 | A1* | 6/2001 | Nitta et al. | 345/211 |
| 2002/0060676 | A1* | 5/2002 | Kim | 345/212 |
| 2002/0075252 | A1* | 6/2002 | Lee | 345/211 |
| 2002/0075253 | A1* | 6/2002 | Park et al. | 345/211 |
| 2002/0180718 | A1* | 12/2002 | La | 345/204 |

FOREIGN PATENT DOCUMENTS

| CN | 1294730 | 5/2001 |
| EP | 0 395 033 | 10/1990 |
| EP | 1 091 287 | 4/2001 |
| EP | 1 091 287 A2 | 4/2001 |
| WO | WO 01/15285 | 3/2001 |

OTHER PUBLICATIONS

Digital Display Working Group, Digital Visual Interface (DVI), Revision 1.0, Initial Specification Release, Apr. 2, 1999.*

(Continued)

*Primary Examiner*—David L. Lewis
(74) *Attorney, Agent, or Firm*—Cantor Colburn LLP

(57) ABSTRACT

An LCD module includes a user connector part that receives power voltages, image signals and control signals from an external host system and outputs the power voltages, image and control signals through a first integrated type connector and an LCD module having a second integrated type connector connected with the first integrated type connector through an FPC. The LCD module receives power voltages and image and control signals through the second integrated type connector, provides image data signals and timing signals to data lines and provides scan signals to gate lines. Namely, the LCD can receive power voltage, the image signals and control signals through the integrated type connector instead of a plurality of connecting terminals, thereby providing an LCD having slim weight and compact size and reducing the size thereof.

17 Claims, 8 Drawing Sheets

OTHER PUBLICATIONS

PCT International Preliminary Examination Report; International application No. PCT/KR2002/000818; International filing date: May 2, 2002; Date of Completion: Apr. 19, 2004.

Chinese Office Action regarding corresponding patent application No. 02825538.0; Date: Sep. 1, 2006 All the references cited in the Search Report are listed above.

* cited by examiner

LIQUID CRYSTAL DISPLAY MODULE AND LIQUID CRYSTAL DISPLAY APPARATUS HAVING THE SAME

TECHNICAL FIELD

The present invention relates to a liquid crystal display (LCD) apparatus, and more particularly to an LCD module having an integrated type connector and LCD having the same.

BACKGROUND ART

In order to confirm the information processed in an information-processing device with the naked eye, a display apparatus that accomplishes an interface function is needed. In the display apparatus, the processed information is in an electrical signal type.

Recently, an LCD that is lighter, and smaller than a CRT type display apparatus has been developed. The LCD has a function such as a full color and a high resolution. As a result, the LCD is widely used as a monitor of a computer, a television receiver, and another display device.

However, the LCD requires a lot of terminals such as a D-SUB, a DVI and a video port, etc., to receive image signals and control signals supplied from an external host system. The terminals are fixed to a printed circuit board (PCB) disposed in the LCD, so that the weight and size of the LCD cannot become lighter and smaller.

Further, since the LCD adopts a lot of connectors for electrically connecting between input terminals and output terminals and a user has to check connection status of the connector and operations of the LCD with other connectors, the throughput of the LCD decreases.

DISCLOSURE OF THE INVENTION

The present invention solves the aforementioned problems by providing a liquid crystal display module having slim weight and compact size.

Also, the invention provides a liquid crystal display having the liquid crystal display module having slim weight and compact size.

In one aspect of the invention, there is provided a liquid crystal display module comprising: a liquid crystal display panel having a plurality of data lines for transmitting data signals, a plurality of gate lines, which are intersecting with the plurality of data lines, for transmitting gate signals and a plurality of pixel regions electrically connected to the plurality data lines and gate lines, the liquid crystal display panel for displaying an image corresponding to a differential voltage between a voltage of the data signals and a voltage of a common electrode in response to the gate signals; a backlight assembly disposed under the liquid crystal display panel, for providing a light to the liquid crystal display panel; a plurality of integrated circuits electrically connected to lines of the liquid crystal display panel; a printed circuit board connected to the integrated circuits, for providing image signals and control signals to the integrated circuits in response to a power voltage; and an integrated type connector having a first type integrated connector and a second integrated type connector being disposed in the printed circuit board, the second integrated type connector for receiving the power voltage, the image signals and the control signals which controls operation of the liquid crystal display panel through the first integrated type connector from a user connecting part and providing the power voltage, image signals and control signals to the printed circuitboard.

The second integrated type connector is connected to the first integrated type connector in a docking manner which is attachable and detachable therebetween and the second integrated type connector is connected to the first integrated type connector connected to the user connecting part by means of a predetermined flexible cable.

The first integrated type connector has a plug shape and the second integrated type connector has a socket shape. The first integrated type connector may further comprise an input port for receiving a predetermined program from an external host system and the second integrated type connector further includes an output port for outputting the program to the printed circuit board.

In another aspect of the invention, there is provided a liquid crystal display apparatus comprising: a liquid crystal display panel; a TAB-integrated circuit connected to a predetermined line formed in the liquid crystal display panel; a printed circuit board connected to the TAB-integrated circuit; a backlight assembly disposed under the liquid crystal display panel; a user connecting part for receiving a power voltage, image signals and control signals for controlling display of the image signals from an external host system and outputting the power voltage, the image signals and the control signals; and a liquid crystal display module for receiving the power voltage, the image signals and the control signals from the user connecting part, providing the image signals and timing signals that control output of the image signals to data lines formed in the liquid crystal display panel and sequentially outputting scan signals to gate lines formed in the liquid crystal display panel.

The liquid crystal display module includes an interfacing printed circuit board having a second integrated type connector, for receiving the power voltage, the image signals and control signals, outputting a backlight power voltage through a first terminal thereof and outputting image data and gate signal through a second terminal thereof; a driving printed circuit board for converting the image data into an analog format, providing the image data to the data lines and sequentially providing the gate signal to the gate lines; and a backlight inverter for providing a power voltage to a lamp in response to the backlight power voltage.

The liquid crystal display module includes an interfacing printed circuit board having a second integrated type connector, for receiving the power voltage, the image signals and control signals, outputting a backlight power voltage through a first terminal thereof, outputting image data through a second terminal thereof and outputting a gate signal through a third terminal thereof; a data driving printed circuit board for converting the image data into an analog format and providing the image data to the data lines; a gate driving printed circuit board for sequentially providing the gate signal to the gate lines; and a backlight inverter for providing a power voltage to a lamp in response to the backlight power voltage.

The interfacing printed circuit board further includes a memory for storing a program supplied from the external host system therein.

The liquid crystal display module has an integrated printed circuit board having a second integrated type connector, for receiving the power voltage, the image signals and control signals, outputting a backlight power voltage through a first terminal thereof, converting the image data into an analog format and providing the image data to the data lines through a second terminal thereof and sequentially providing the gate signal to the gate lines through a third terminal thereof; and a backlight inverter for providing a power voltage to a lamp in response to the backlight power voltage.

The liquid crystal display module has an integrated printed circuit board having a second integrated type connector, for receiving the power voltage, the image signals and control signals, outputting a backlight power voltage through a first terminal thereof, converting the image data into an analog format and providing the image data and a scan signal that sequentially selects the image data to the gate lines through a second terminal thereof; and a backlight inverter for providing a power voltage to a lamp in response to the backlight power voltage.

According to the LCD, the LCD can receive the power voltage, the image signals and control signals through the integrated type connector instead of a plurality of connecting terminals, thereby providing the LCD having slim weight and compact size and reducing the cost thereof.

BRIEF DESCRIPTION OF DRAWINGS

The above objects and other advantages of the present invention will become more apparently by describing in detail the exemplary embodiments thereof with reference to the accompanying drawings, in which.

BEST MODE FOR CARRYING OUT THE INVENTION

Reference will now be made in detail to the exemplary embodiments of the present invention, examples of which are illustrated in the accompanying drawings. Hereinafter, exemplary embodiments are described with reference to the accompanying drawings.

Figure 1:
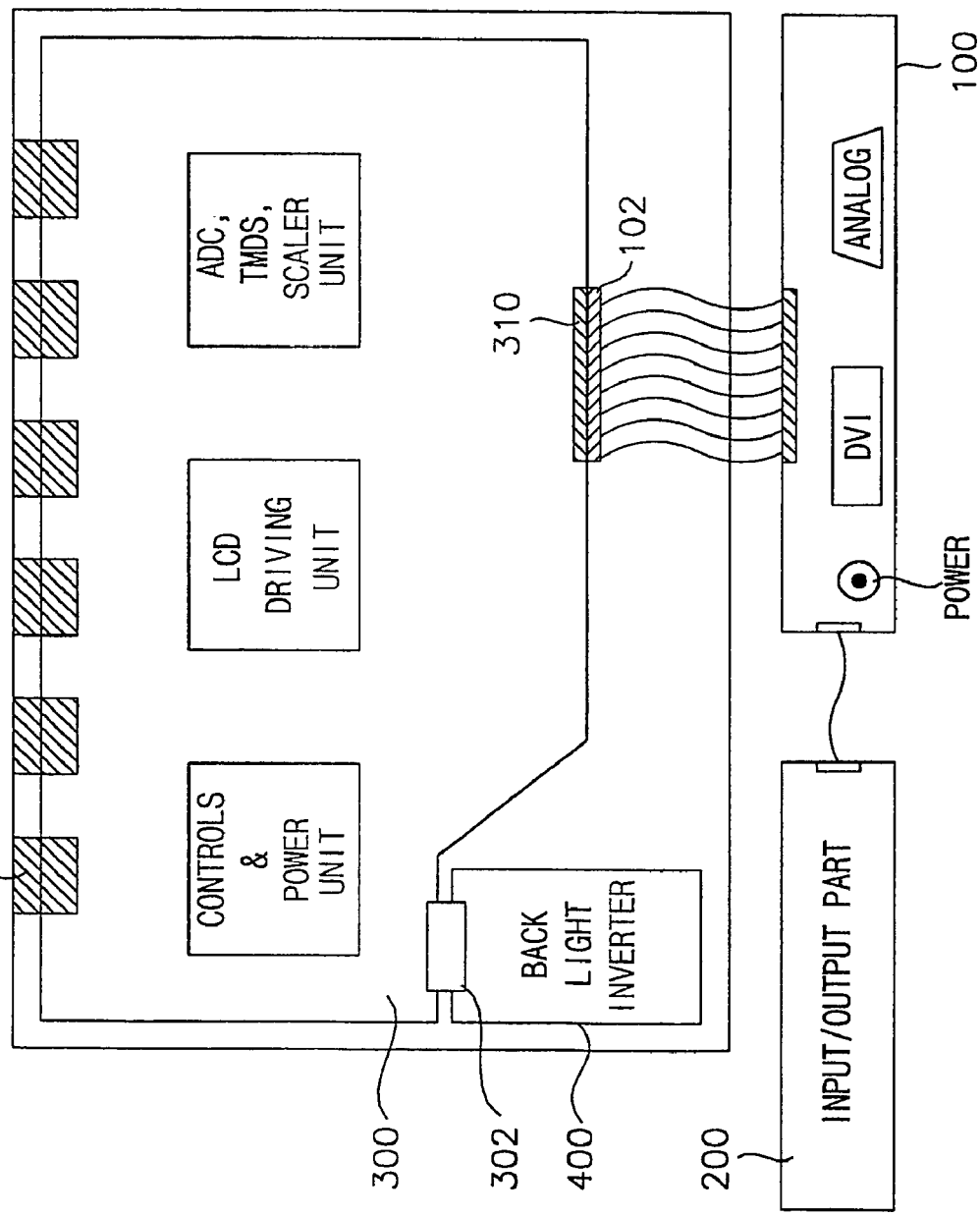
FIG. 1 is a view showing an LCD having an integrated type connector in accordance with a first embodiment of the present invention.

FIG. 1 is a view showing an LCD having an integrated type connector in accordance with an embodiment of the present invention.

Referring to FIG. 1, the LCD includes a user connecting part 100, an input/output part 200 and an LCD module.

The user connecting part 100 includes a first input terminal 110 for receiving a power voltage, a second input terminal 112 for receiving an image signal formatted in analog type from an external host system (not shown), a third input terminal 114 for receiving an image signal formatted in digital type from the external host system and a first integrated type connector 102 for outputting the power voltage and the image signals to the LCD module 900 through a plurality of ports. The first integrated type connector 102 is connected with the user connecting part 100 by means of a flexible printed circuit board (hereinafter, referred to as an "FPC").

The input/output part 200 includes a plurality of keys to control functions of the LCD module 900 such as contrast, color, position of screen, image, brightness, mode of video, auto-configuration, system information and power and so on. The input/output part 200 provides key-input signals generated by a user toward the LCD module 900 through the user connecting part 100, receives responsive signals corresponding to the key-input signals from the LCD module 900 and indicates the responsive signals to the user with an LED or the like. The user can control the functions of the LCD module 900 with OSD provided on the screen of the LCD module 900 instead of the plurality of keys.

The LCD module 900 includes an integrated board 300, a backlight inverter 400 and an LCD panel (not shown) and displays a predetermined image in response to the power voltage, image signals and control signal provided from the user connecting part 100.

The integrated board 300 includes a first interfacing part 302, a second integrated type connector 310, a control/power part, an LCD driving part and an ADC/TMDS/scaler part. The integrated board 300 receives the power voltage, the image signals and the control signal and provides the power voltage to the backlight inverter 400 through the first interfacing part 302. The integrated board 300 provides the image signal formatted in the analog type and a gate signal to the LCD panel through driver IC 304. The driver IC 304 that is TAB (tape-automated bonding) IC includes a data driver IC connected to a data line formed in the LCD panel a gate driver IC connected to a gate line formed therein. The data driver IC provides a data signal to the data line and the gate driver IC sequentially provides a gate signal to the gate lines.

The first integrated type connector 102 has a plug shape or a socket shape and the second integrated type connector 310 has a shape opposite to the first integrated type connector 102 between the plug and socket shapes.

As described above, since the power voltage, the image signals and the control signals are provided to the LCD module 900 through integrated ports such as the first and second integrated type connectors 102 and 310, there is no need to use cables for checking signals to check the operations of the LCD module 900 and the LCD, thereby decreasing production steps of the LCD. Also, the appearance of the LCD becomes simple by using the integrated type connectors.

Figure 2:
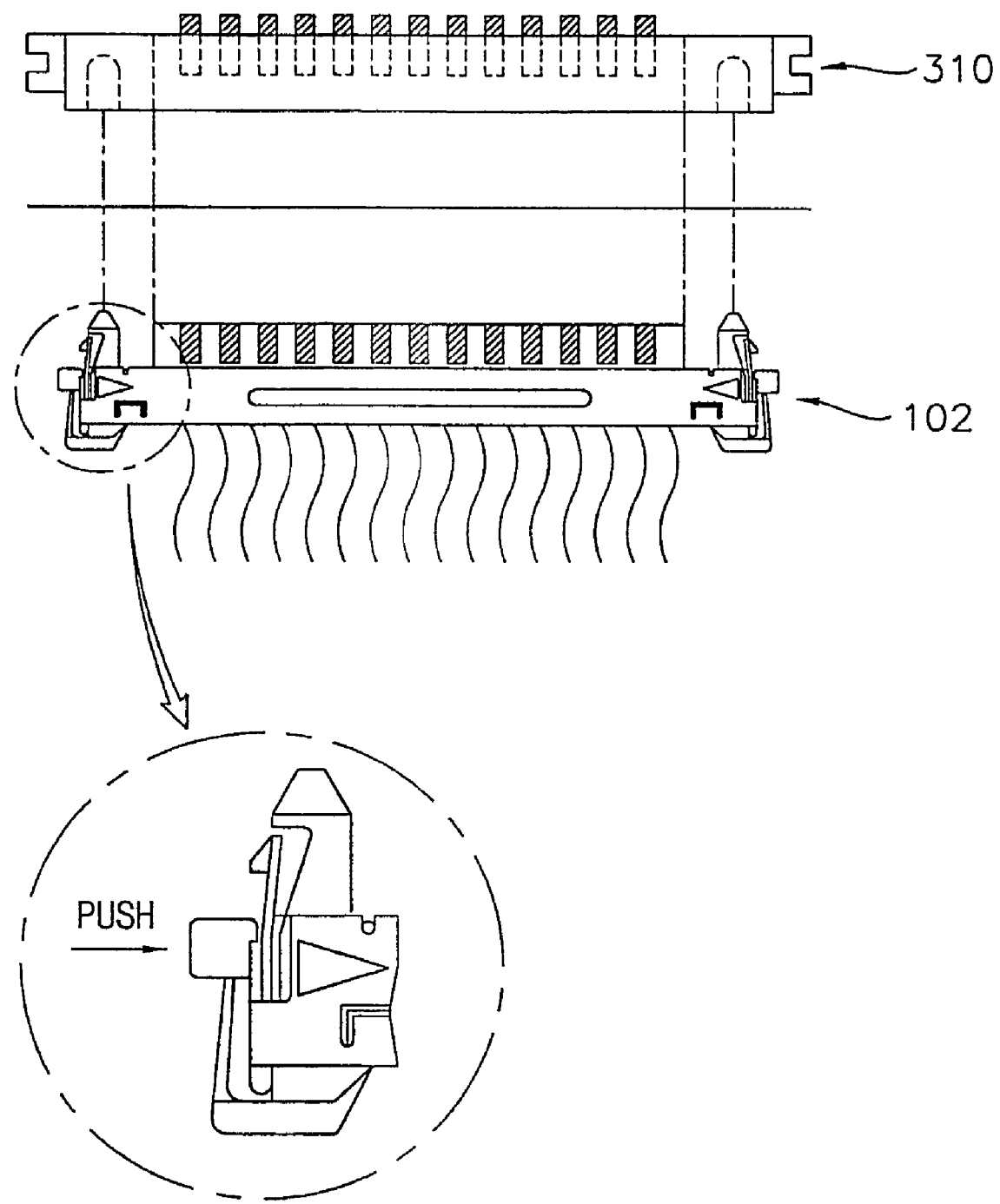
FIG. 2 is a view showing the integrated type connectors as shown in FIG. 1.

FIG. 2 is a view showing the first and second integrated type connectors shown in FIG. 1.

Referring to FIG. 2, the first integrated type connector 102 is connected with the user connecting part 100 by means of the FPC and the second integrated type connector 310 is connected with the LCD module 900. The first and second integrated type connectors 102 and 310 include a terminal for the power voltage, a plurality of terminals for the image signals formatted in the analog type, a plurality of terminals for the image signals formatted in the digital type and a terminal for downloading a program from the external host system, respectively.

In general, the image signals supplied from the external host system have to be converted into a form corresponding to a resolution of the LCD. The scaler functions to convert the image signals into the form corresponding to the resolution of the LCD and the program for the operation of the scaler is downloaded from the external host system through the first and second integrated type connectors 102 and 310.

The first and second integrated type connectors 102 and 310 respectively have a hook and a hole so that the first and second integrated type connectors are easily connected with each other. It is preferably that in a case where the first integrated type connector 102 has the plug shape, the second integrated type connector 310 has the socket shape.

The plurality of terminals connected with the first integrated type connector 102 and the plurality of terminals connected with the second integrated type connector 310 are disposed on the same line.

Although the connector having a socket shape which is provided to the LCD module and the connector having a plug shape which is provided to the user connecting part are shown in the figures, the connector having a socket type and the connector having a plug type may be provided to the user connecting part and the LCD module, respectively.

Further, a hook for connection is provided to the socket type connector in the figure. However, the hook for connection may be provided to the plug type connector.

As described above, in the integrated type connector in accordance with the present invention, the power signal, various image signals and control signals are applied to the plurality of terminals that are arranged on the same line. Therefore, the structure of the connector is compact and the LCD module may be slimed.

Further, the integrated type connector in accordance with the present invention has a docking form. Therefore, when performing an inspection process for checking whether or not the LCD module and the LCD device are normally operated after manufacturing the LCD module and the LCD device, the module or device is coupled to a corresponding inspection device (not shown) via a docking method so that the module or device are operated by automatically downloading a program from the external host system.

Also, since a specific port of the integrated type connector may be used as a download terminal that receives the program needed to the LCD, it is able to easily standardize the hardware of the LCD.

Further, as described in the above embodiment, the conventional LCD separately adopts input terminals for receiving the power voltage, image signals and control signals. However, in the present invention, by applying the power signal or any various signals via the integrated type connector, the manufacturer may easily confirm the normal operation of the LCD. As a result, the inspection process may be simplified and any additional cost for separately providing a connector may be reduced.

Further, the user does not require any lines for supplying power or applying various image signals to the LCD device, the LCD device may be connected to a host system for the inspection via the integrated connector. Thus, the assembling process may be easily performed.

Hereinafter, one embodiment of the integrated type board as shown in FIG. 1 will be explained with reference to the attached figures.

Figure 3:
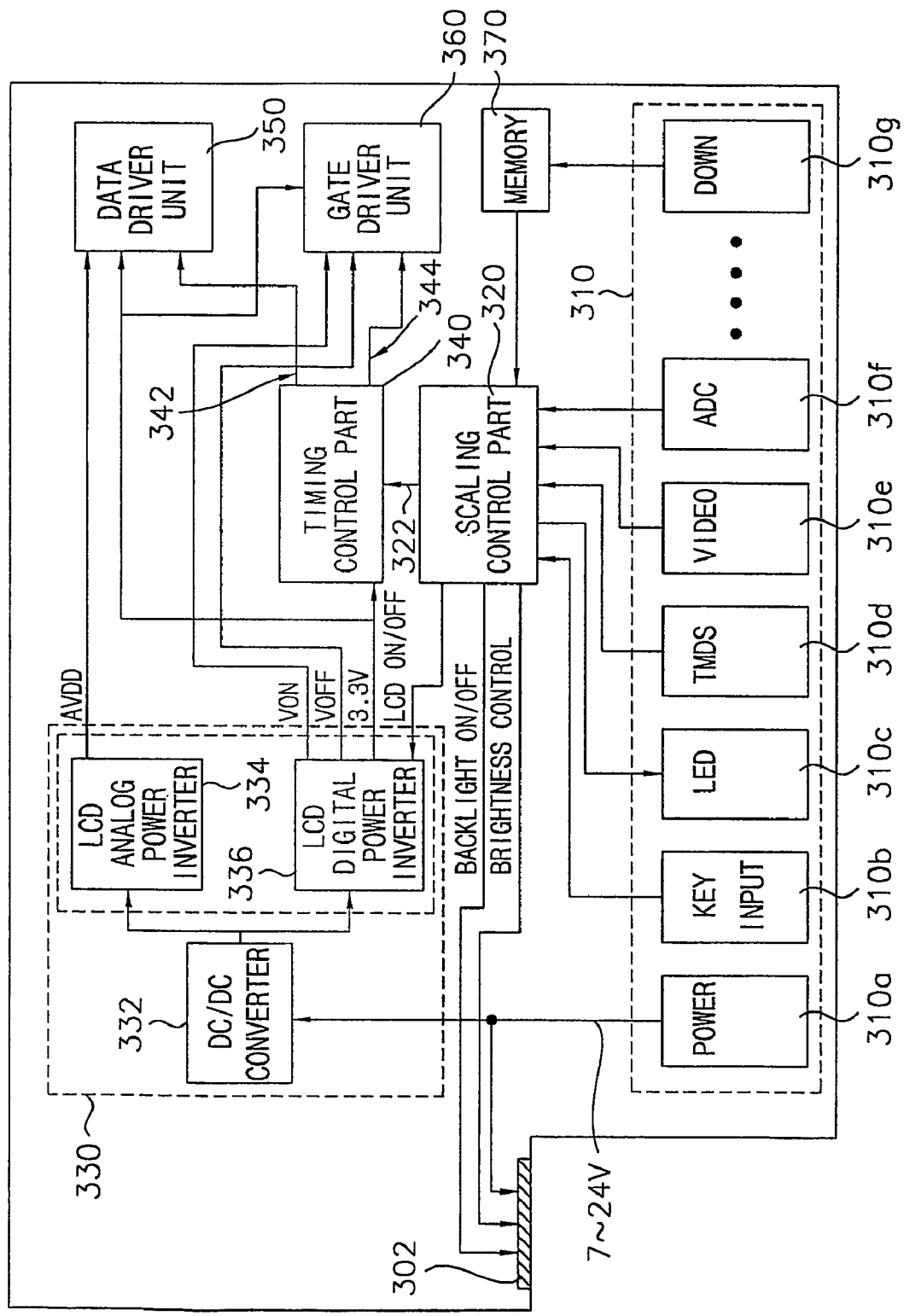
FIG. 3 is a block diagram showing a first embodiment of an integrated board shown in FIG. 1.

FIG. 3 is a block diagram showing a first embodiment of the integrated board shown in FIG. 1.

Referring to FIGS. 1 to 3, the integrated board 300 includes the first interfacing part 302, the second integrated type connector 310, a scaling control part 320, a power control part 330, a timing control part 340, a data driver unit 350, a gate driver unit 360 and a memory 370.

The second integrated type connector 310 includes a power voltage port 310a, a key input port 310b, an LED port 310c, a transition minimized differential signaling (TMDS) port 310d, a video port 310e, an ADC port 310f and a download port 310g. The second integrated type connector 310 is connected with the first integrated type connector 102 of the user connecting part 100 connected with the external host system. The second integrated type connector 310 provides signals from the external host system through the first integrated type connector 102 to the scaling control part 320 and power control part 330.

The scaling control part 320 scales the signal from the second integrated type connector 310, provides the scaled signal 322 to the timing control part 340 and provides an LCD on/off control signal to the power control part 330. The scaling control part 320 provides a backlight on/off control signal and brightness control signal to the backlight inverter 400 through the first interfacing part 302.

The power control part 330 includes a DC/DC converter 332, an LCD analog power inverter 334 and an LCD digital power inverter 336. The power control part 330 changes the level of the power voltage supplied through the power voltage port 310a of the second integrated type connector 310 and provides a predetermined power voltage to the timing control part 340, the data driver unit 350 and the gate driver unit 360. The power control part 330 provides a control voltage for controlling the gate on/off to the gate driver unit 360.

The timing control part 340 receives a vertical synchronizing signal Vsync, a horizontal synchronizing signal Hsync, a main clock signal MCLK, RGB image data and a data enable signal DE from the scaling control part 320. To control the display timing of the RGB data, the timing control part 340 generates a first timing signal 342 in response to the vertical and horizontal synchronizing signals Vsync and Hsync and provides the first timing signal 342 and the RGB data to the data driver unit 350. The first timing signal 342 includes a load signal TP and a horizontal synchronizing start signal STH. The load signal TP indicates timing that the RGB data are output to the LCD panel through the data driver IC and the horizontal synchronizing start signal STH indicates a scan timing of the scan lines.

To control the display timing of the RGB data, the timing control part 340 generates a second timing signal 344 in response to the vertical and horizontal synchronizing signals Vsync and Hsync from the scaling control part 320 and provides the second timing signal 344 to the gate driver unit 360. The second timing signal 344 includes a gate selecting signal CPV, a vertical synchronizing start signal STV and an output enable signal OE. The gate selecting signal CPV controls the output of the gate on/off signal and the vertical synchronizing start signal STV selects a first scan lines among the scan lines.

The data driver unit 350 outputs a data voltage to the LCD panel in response to the image signal and the first timing signal 342 from the timing control part 340. That is, the data driver unit 350 stores the RGB data from the timing control part 340 and outputs the data voltages D1, D2, . . . , Dn to the LCD panel in response to the load signal TP.

The gate driver unit 360 outputs the gate signal in response to the second timing signal 344 from the timing control part 340. That is, the gate driver unit 360 receives the gate clock signal and the vertical synchronizing start signal STV and outputs the gate signals G1, G2, . . . , Gn to the LCD panel, so that a predetermined voltage is supplied to the respective pixels formed in the LCD panel.

In the memory 370, a predetermined program inputted through the download port 310g of the second integrated type connector 310 is stored. The memory 370 provides the stored program to the scaling control part 340. The program includes a control program for the scaling control part 340, a system program for the LCD or a verifying program for the LCD.

As aforementioned above, the data signal, the gate signal and the control signal from the LCD module are outputted through the driving PCB disposed in one side of the LCD panel. However, the data signal and the gate signal can be output through the data driver PCB and the gate driver PCB, respectively.

Figure 4:
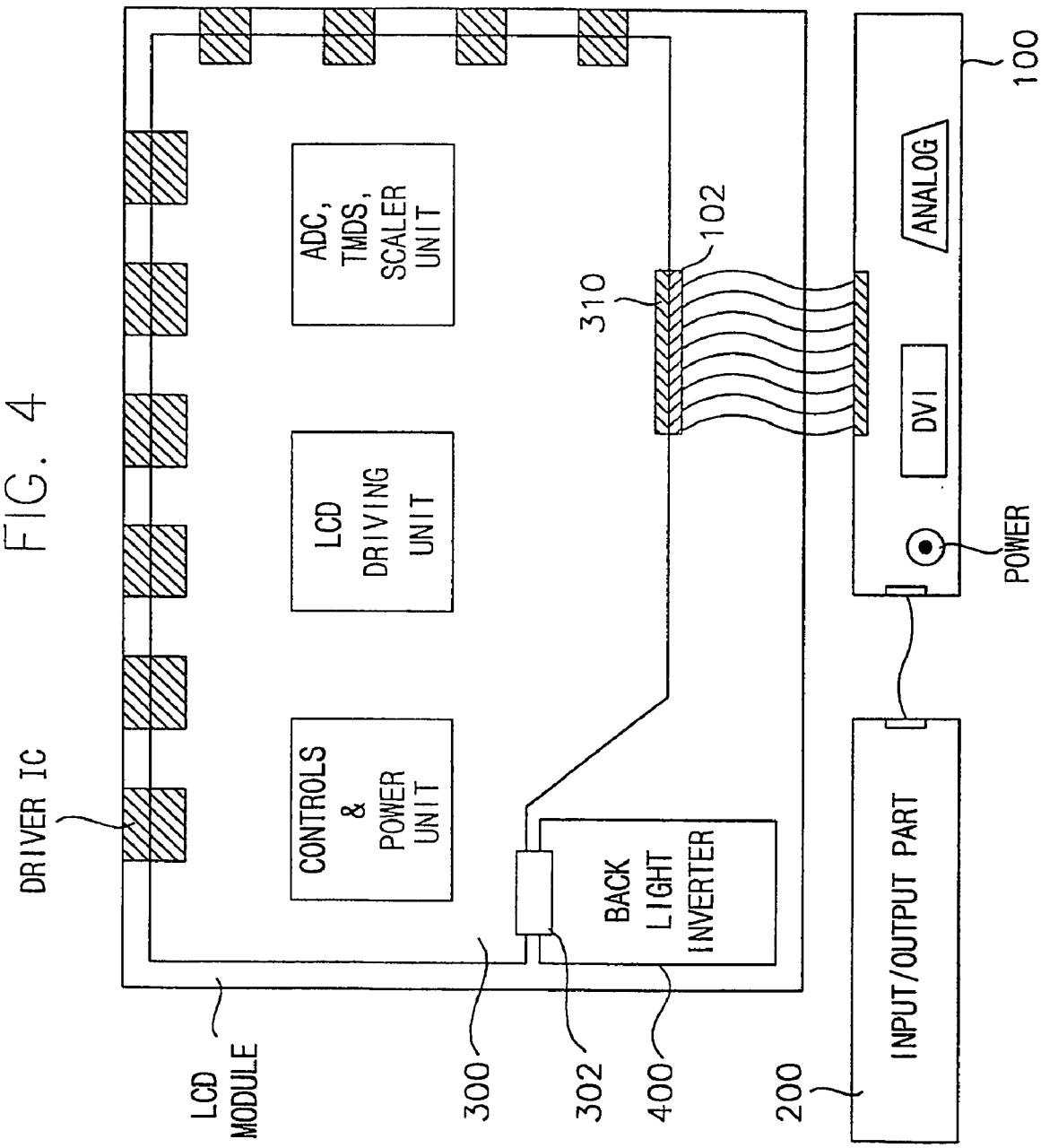
FIG. 4 is a view showing an LCD having an integrated type connector in accordance with a second embodiment of the present invention.

FIG. 4 is a view showing an LCD in accordance with an exemplary embodiment of the present invention.

Referring to FIG. 4, the LCD includes an integrated board 300 and an LCD panel. A first end of the integrated board 30 is connected with the LCD panel by means of a data driver IC and second end of the integrated board 30 is connected with the LCD by means of a gate driver IC. The data driver IC provides a data signal to the LCD panel and the gate driver IC provides a gate signal thereto.

The LCD shown in FIG. 4 adopts a single bank structure of which the gate driver IC is disposed in the first end of the LCD. However, the first and second integrated type connectors 102 and 310 can be applied to an LCD having a dual bank structure of which the gate driver IC is disposed in the first and second ends of the LCD.

Figure 5:
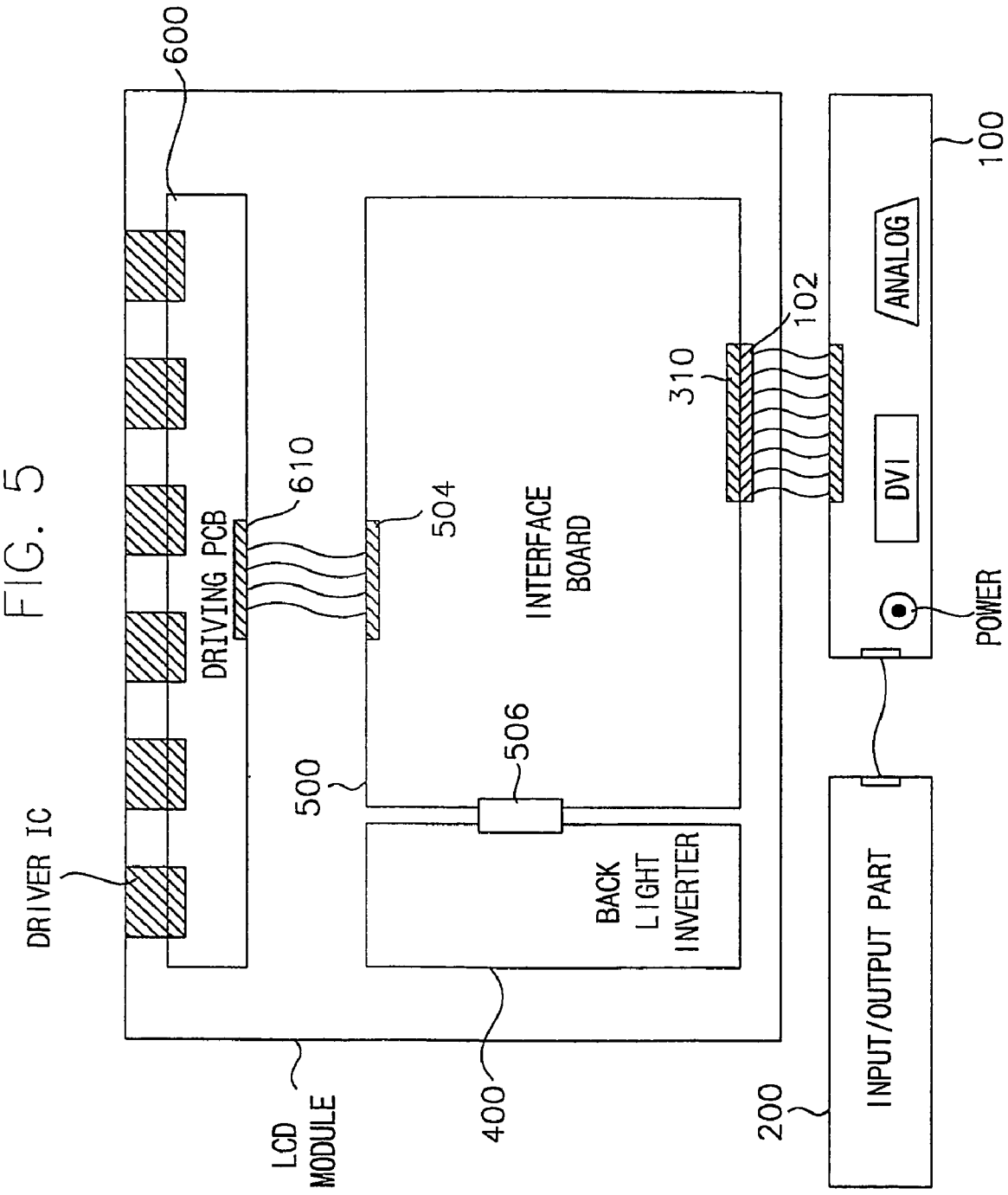
FIG. 5 is a view showing an LCD having an integrated type connector in accordance with a third embodiment of the present invention.

FIG. 5 is a view showing an LCD in accordance with an exemplary embodiment of the present invention.

Referring to FIG. 5, the LCD includes the user connecting part 100, the input/output part 200 and the LCD module 900. The user connecting part 100 and the input/output part 200 execute the functions identical with the function of that shown in FIG. 1.

The LCD module 900 includes an interfacing PCB 500, a backlight inverter 400, a driving PCB 600 and an LCD panel (not shown) and displays a predetermined image in response to a power voltage, an image signal and a control signal supplied from the user connecting part 100.

In particular, the interfacing PCB 500 includes the second integrated type connector 310 and first and second interfacing parts 502 and 504 and receives the power voltage, the image signal and the control signal through the first integrated type connector 102 of the user connecting part 100 and the second integrated type connector 310. The interfacing PCB 500 provides the image signal and the control signal to the driving PCB 600 through the first interfacing part 504 and provides the power voltage for driving the backlight through the second interfacing part 506.

In a case where the LCD module 900 has an analog interface, the image signal is the RGB signal formatted in the analog type and the interfacing PCB 500 is an ADC (analog-to-digital converter) that converts the analog image signal into the digital image signal. When the ADC is provided, the EMI and noise problems can be reduced, which is an advantage of using the analog signals. Further, the signals may be transmitted over a long distance.

Also, in a case where the LCD module 900 has a digital interface, the image signal is the RGB signal formatted in the digital type.

The backlight inverter 400 receives the backlight power voltage from the interfacing PCB 500 and provides the predetermined power voltage to the backlight (not shown).

The LCD panel disposed in front side of the LCD module 900 includes the data lines and gate lines formed in a matrix, switching devices of which gate is connected with the gate line and source is connected with the data line, capacitors connected with drain of the switching devices and storage capacitors. Responsive the gate signal G1, G2, . . . , Gn input from the driving PCB 600 through the gate lines, the LCD panel displays the image corresponding the voltage of the data signal D1, D2, . . . , Dn supplied through the data lines.

Figure 6:
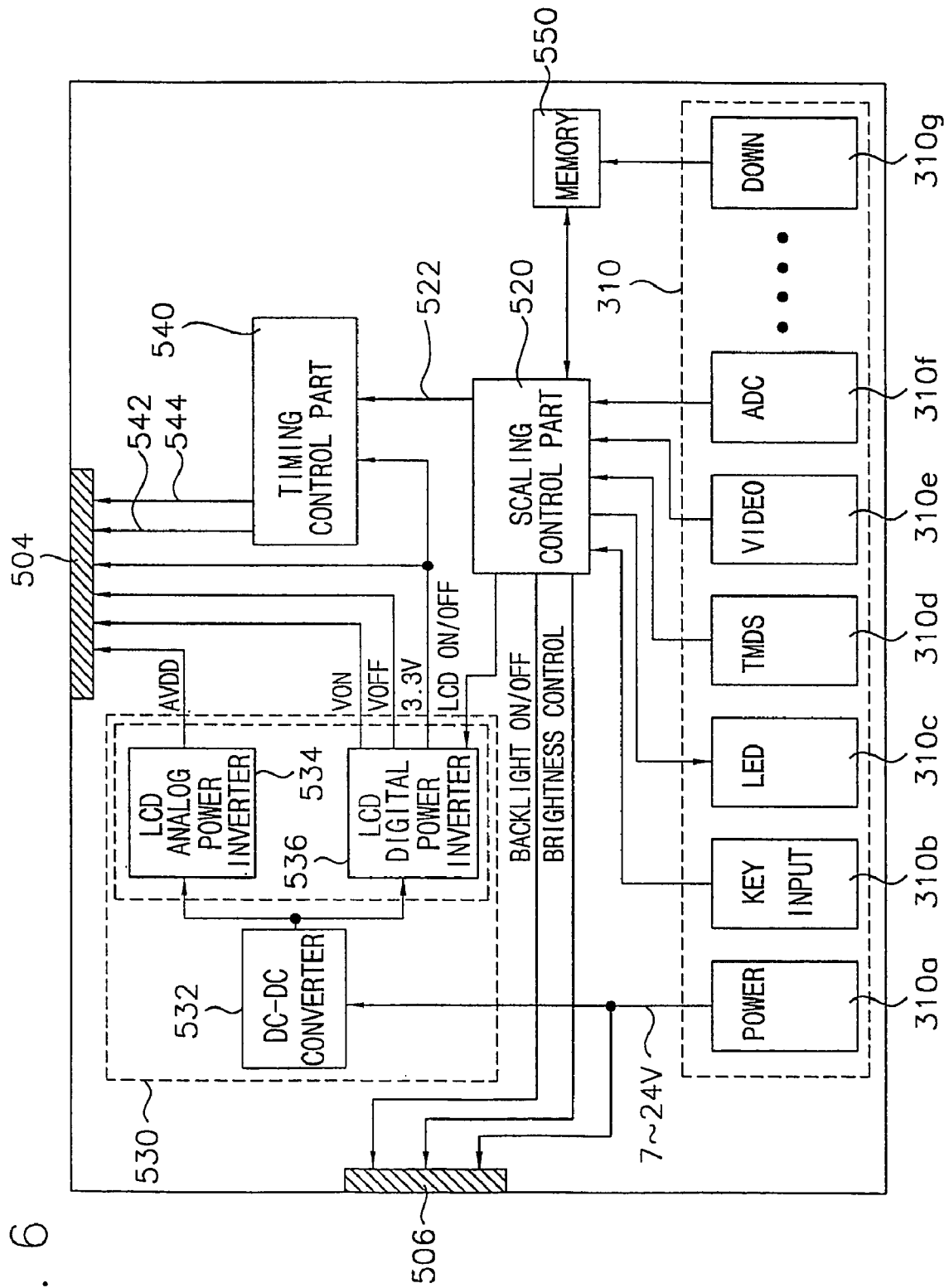
FIG. 6 is a block diagram showing an interfacing PCB as shown in FIG. 5.

FIG. 6 is a block diagram showing the interfacing PCB shown in FIG. 5.

Referring to FIG. 6, the interfacing PCB 600 includes the second integrated type connector 310, the first and second interfacing parts 504 and 506, the scaling control part 520, the power voltage control part 530, the timing control part 540 and the memory 550.

The second integrated type connector 310 includes the power voltage port 310a, the key input port 310b, the LED port 310c, the TMDS port 310d, the video port 310e, the ADC port 310f and the download port 310g. The second integrated type connector 310 is connected with the first integrated type connector 102 of the user connecting part 100 connected with the external host system. The second integrated type connector 310 provides signals from the external host system through the first integrated type connector 102 to the scaling control part 520 and power control part 530.

The scaling control part 520 scales the signal from the second integrated type connector 310, provides the scaled signal 522 to the timing control part 540 and provides an LCD on/off control signal to the power control part 530. The scaling control part 520 provides a backlight on/off control signal and brightness control signal to the backlight inverter 400.

The power control part 530 includes a DC/DC converter 532, an LCD analog power inverter 34 and an LCD digital power inverter 536. The power control part 530 changes the level of the power voltage supplied through the power voltage port 310a of the second integrated type connector 310 and provides a predetermined power voltage to the timing control part 540 and the driving PCB 600. The power control part 530 provides a control voltage VON and VOFF for controlling the gate on/off to the driving PCB 600.

Particularly, the DC/DC converter 532 receives the power voltage within the range of about 7 to 24 volts through the power voltage port 310a of the second integrated type connector 310 and provides the power voltage to the LCD analog power inverter 534 and the LCD digital power inverter 536.

The LCD analog power inverter 534 receives a first power voltage from the DC/DC converter 532 and provides the first power voltage to the driving PCB 600 through the second interfacing part 504.

The LCD digital power inverter 536 receives a second power voltage from the DC/DC converter 532 and generates a predetermined power voltage having 3.3 volts in response to the LCD on/off control signal supplied from the scaling control part 520. The LCD digital power inverter 536 provides the 3.3 volts to the timing control part 540 and the driving PCB 600 and provides the gate on/off voltage VON and VOFF to the driving PCB 600.

The timing control part 540 receives a vertical synchronizing signal Vsync, a horizontal synchronizing signal Hsync, a main clock signal MCLK, RGB image data and a data enable signal DE from the scaling control part 520. To control the display timing of the RGB data, the timing control part 540 generates a first timing signal 542 in response to the vertical and horizontal synchronizing signals Vsync and Hsync and provides the first timing signal 542 and the RGB data to the driving PCB 600. The first timing signal 542 includes a load signal TP and a horizontal synchronizing start signal STH. The load signal TP indicates a timing that the RGB data are outputted to the LCD panel through the data driver IC and the horizontal synchronizing start signal STH indicates a scan timing of the scan lines.

To control the display timing of the RGB data, the timing control part 540 generates a second timing signal 544 in response to the vertical and horizontal synchronizing signals Vsync and Hsync from the scaling control part 320 and provides the second timing signal 544 to the driving PCB 600. The second timing signal 544 includes a gate selecting signal CPV, a vertical synchronizing start signal STV and an output enable signal OE.

In the memory 550, a predetermined program inputted through the download port 310g of the second integrated type connector 310 is stored. The memory 550 provides the stored program to the scaling control part 540. The program includes a control program for the scaling control part 340, a system program for the LCD or a verifying program for the LCD.

Figure 7:
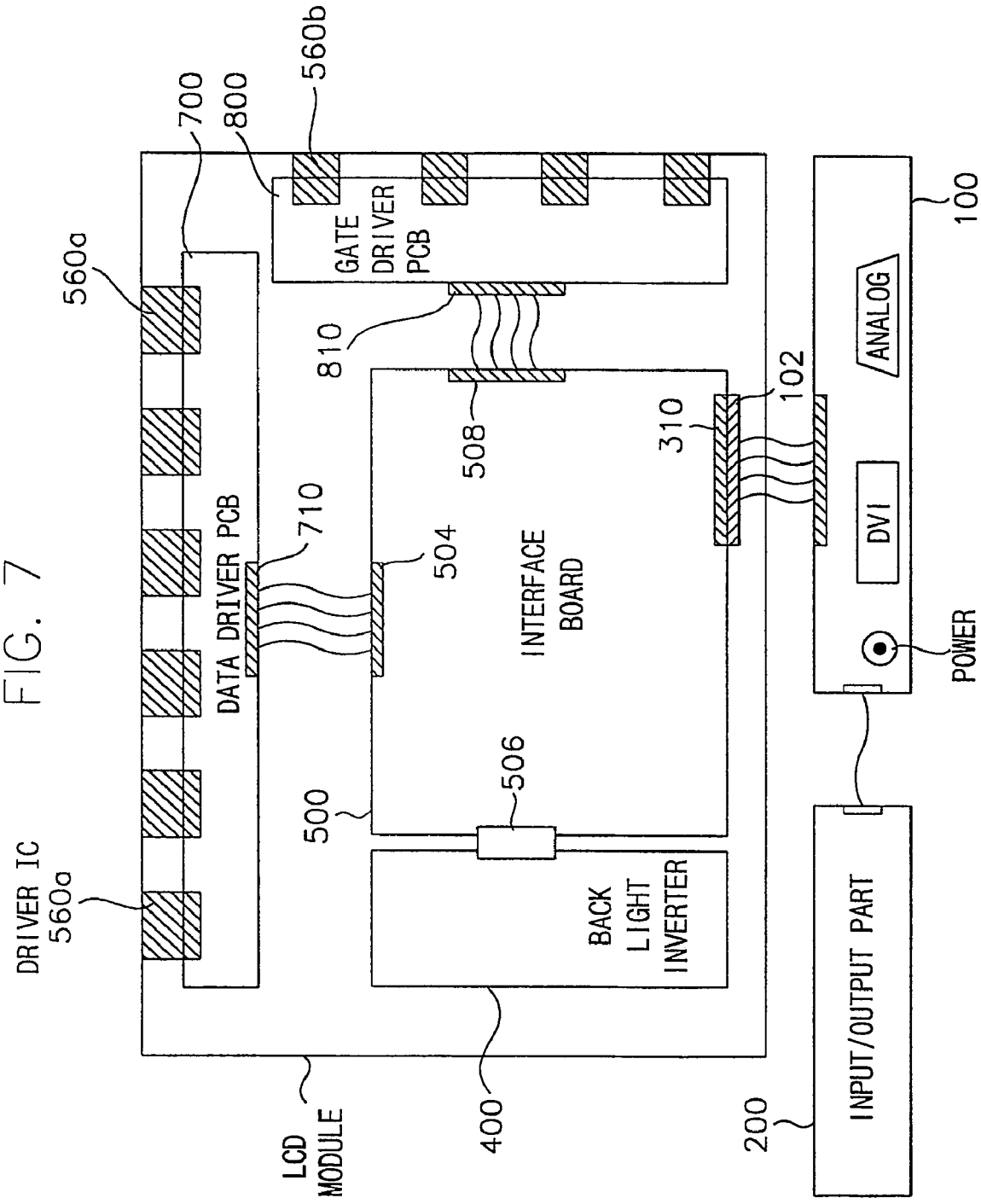
FIG. 7 is a view showing an LCD having an integrated type connector in accordance with a third exemplary embodiment of the present invention.

FIG. 7 is a view showing an LCD in accordance with an exemplary embodiment of the present invention.

Referring to FIG. 7, the LCD includes the user connecting part 100, the input/output part 200 and the LCD module 900. The user connecting part 100 and the input/output part 200 execute the functions identical with the function of that shown in FIG. 1.

The LCD module 900 includes the interfacing PCB 500, the backlight inverter 400, a data driver PCB 700, a gate driver PCB 800 and an LCD panel (not shown) and displays a predetermined image in response to the power voltage, the image signal and the control signal supplied from the user connecting part 100.

In particular, the interfacing PCB 500 includes the second integrated type connector 310 and first, second and third interfacing parts 504, 506 and 508 and receives the power voltage, the image signal and the control signal through the first integrated type connector 102 of the user connecting part 100 and the second integrated type connector 310. The interfacing PCB 500 provides the power voltage for driving the backlight through the first interfacing part 504, provides the image signal and the first timing signal to the data driver PCB 700 through the second interfacing part 506 and provides the second timing signal to the gate driver PCB 800 through the third interfacing part 508.

In a case where the LCD module 900 has an analog interface, the image signal is the RGB signal formatted in the analog type and the interfacing PCB 500 adopts the ADC that converts the analog image signal into the digital image signal. When the ADC is provided, the EMI and noise problems can be reduced, which is an advantage of using the analog signals. Further, the signals may be transmitted over a long distance.

Also, in a case where the LCD module 900 has a digital interface, the image signal is the RGB signal formatted in the digital type.

The backlight inverter 400 receives the backlight power voltage from the interfacing PCB 500 and provides the predetermined power voltage to the backlight (not shown).

The data driver PCB 700 includes an interfacing part 710 and a plurality of data driver ICs 560a. The data driver PCB 700 outputs a data voltage to the LCD panel in response to the image signal and the first timing signal from the interfacing part 500. That is, the data driver PCB 700 stores the RGB data and outputs the data voltages D1, D2, . . . , Dn to the LCD panel in response to the load signal TP.

The gate driver PCB 800 includes an interfacing part 810 and a plurality of gate driver ICs 560b. The gate driver PCB 800 outputs the gate signal to the LCD panel in response to the second timing signal 344 from the interfacing PCB 500.

That is, the gate driver PCB 800 receives the gate clock signal and the vertical synchronizing start signal STV and outputs the gate signals G1, G2, . . . , Gn to the LCD panel, so that a predetermined voltage is supplied to the respective pixels formed in the LCD panel.

The LCD shown in FIG. 7 adopts a single bank structure of which the gate driver IC 560b is disposed in the first end of the LCD. However, the first and second integrated type connectors 102 and 310 can be applied to an LCD having a dual bank structure of which the gate driver IC 560b is disposed in the first and second ends of the LCD.

Figure 8:
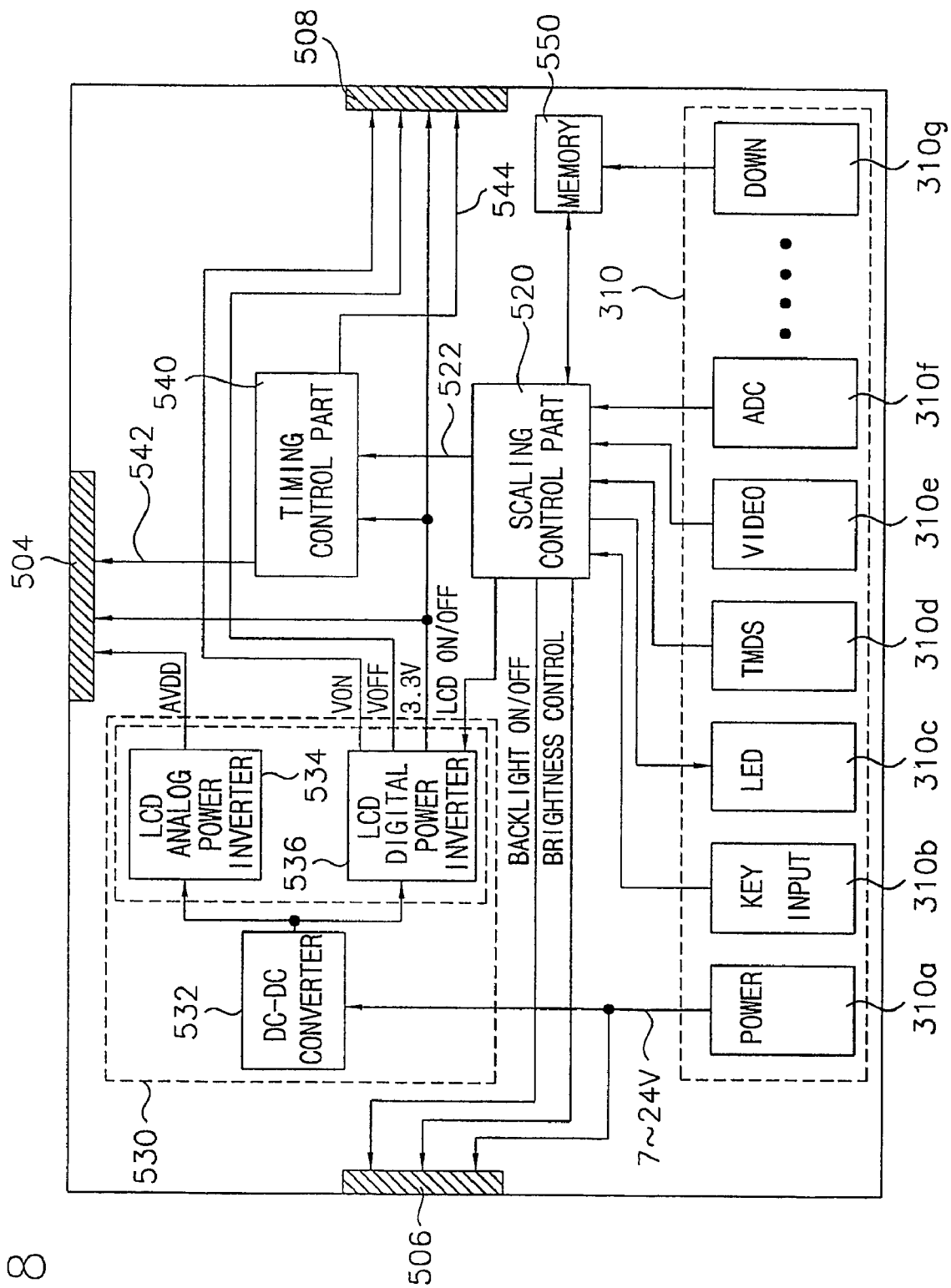
FIG. 8 is a block diagram showing an interfacing PCB as shown in FIG. 7.

FIG. 8 is a block diagram showing the interfacing PCB shown in FIG. 7.

Referring to FIGS. 7 and 8, the interfacing PCB 500 includes the first to third interfacing part 504, 506 and 508, the second integrated type connector 310, the scaling control part 520, the power control part 530, the timing control part 540 and a memory 550 as explained with reference to FIG. 6. Any further descriptions will be omitted.

The power control part 530 includes a DC/DC converter 532, an LCD analog power inverter 534 and an LCD digital power inverter 536. The power control part 530 changes the level of the power voltage supplied through the power voltage port 310a of the second integrated type connector 310 and provides a predetermined power voltage to the timing control part 540, the data driver PCB 700 and the gate driver PCB 800. The power control part 530 provides a control voltage VON and VOFF for controlling the gate on/off to the gate driver PCB 800.

The DC/DC converter 532 receives the power voltage within the range of about 7 to 24 volts through the power voltage port 310a of the second integrated type connector 310 and provides the power voltage to the LCD analog power inverter 534 and the LCD digital power inverter 536.

The LCD analog power inverter 534 receives a first power voltage from the DC/DC converter 532 and provides an analog power voltage AVDD to the data driver PCB 700 through the second interfacing part 504. The LCD digital power inverter 536 receives a second power voltage from the DC/DC converter 532 and generates a predetermined power voltage having 3.3 volts in response to the LCD on/off control signal supplied from the scaling control part 520. The LCD digital power inverter 536 provides the 3.3 volts to the timing control part 540, the data driver PCB 700 and the gate driver PCB 800 and provides the gate on/off voltage VON and VOFF to the gate driver PCB 800.

The timing control part 540 receives a vertical synchronizing signal Vsync, a horizontal synchronizing signal Hsync, a main clock signal MCLK, RGB image data and a data enable signal DE from the scaling control part 520. To control the display timing of the RGB data, the timing control part 540 generates a first timing signal 542 in response to the vertical and horizontal synchronizing signals Vsync and Hsync and provides the first timing signal 542 and the RGB data to the data driver PCB 700. The first timing signal 542 includes a load signal TP and a horizontal synchronizing start signal STH. The load signal TP indicates timing that the RGB data are output to the LCD panel through the data driver IC 560a and the horizontal synchronizing start signal STH indicates a scan timing of the scan lines.

To control the display timing of the RGB data, the timing control part 540 generates a second timing signal 544 in response to the vertical and horizontal synchronizing signals Vsync and Hsync from the scaling control part 320 and provides the second timing signal 544 to the gate driver PCB

800. The second timing signal 544 includes a gate selecting signal CPV, a vertical synchronizing start signal STV and an output enable signal OE.

In the memory 550, a predetermined program inputted through the download port 310g of the second integrated type connector 310 is stored. The memory 550 provides the stored program to the scaling control part 540. The program includes a control program for the scaling control part 340, a system program for the LCD or a verifying program for the LCD.

In the above embodiment, a separate interface PCB is installed in an LCD module for maintaining compatibleness with a general CRT type monitor and the integrated type connector is provided to the interface PCB. However, the integrated type connector may be applied to an LCD module without the above interface PCB.

According to the above-mentioned LCD, the LCD can receive the power voltage, the image signals and control signals through the integrated type connector instead of a plurality of connecting terminals, thereby providing the LCD having slim weight and compact size and reducing the cost thereof.

The integrated type connector is connected with another device of the LCD through the FPC, so that the LCD can be designed to have various configurations.

Also, since the integrated type connector is used as a download terminal that receives the program needed to the LCD, it is able to easily standardize the hardware of the LCD.

Further, although the LCD does not separately adopt input terminals for receiving the power voltage, image signals and control signals, auto test functions that checks the operation status of the LCD can be executed through the integrated type connector.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

The invention claimed is:

1. A liquid crystal display module comprising:
    a liquid crystal display panel having a plurality of data lines for transmitting data signals, a plurality of gate lines, which are intersecting with the plurality of data lines, for transmitting gate signals and a plurality of pixel regions electrically connected to the data lines and gate lines, the liquid crystal display panel displaying images corresponding to a differential voltage between a voltage of the data signals and a voltage of a common electrode in response to the gate signals;
    a backlight assembly disposed under the liquid crystal display panel, for providing a light to the liquid crystal display panel;
    a plurality of integrated circuits electrically connected to lines of the liquid crystal display panel;
    a printed circuit board, connected to the integrated circuits, for providing image signals and control signals to the integrated circuits in response to a power voltage; and
    an integrated type connector having a first integrated type connector and a second integrated type connector and being disposed in the printed circuit board, the second integrated type connector receiving the power voltage, the image signals and the control signals which controls operation of the liquid crystal display panel though the first integrated type connector from a user connecting part and providing the power voltage, image signals and control signals to the printed circuit board.

2. The liquid crystal display module of claim 1, wherein the second integrated type connector is connected to the first integrated type connector in a docking manner which is attachable and detachable between the second and first integrated type connectors.

3. The liquid crystal display module of claim 1, wherein the second integrated type connector is connected to the first'integrated type connector connected to the user connecting part by means of a predetermined flexible cable.

4. The liquid crystal display module of claim 1, wherein the first integrated type connector has a plug shape and the second integrated type connector has a socket shape.

5. The liquid crystal display module of claim 1, wherein the first integrated type connector comprises an input port for receiving a predetermined program from an external host system, and the second integrated type connector further comprises an output port for outputting the program to the printed circuit board.

6. A liquid crystal display apparatus comprising:
    a liquid crystal display panel;
    an integrated circuit connected to a predetermined line formed in the liquid crystal display panel;
    a printed circuit board connected to the integrated circuit;
    a backlight assembly disposed under the liquid crystal display panel;
    a user connecting part for receiving a power voltage, image signals and control signals for controlling display of the image signals from an external host system and outputting the power voltage, the image signals and the control signals; and
    a liquid crystal display module for receiving the power voltage, the image signals and the control signals from the user connecting part, providing the image signals and timing signals that control output of the image signals to data lines formed in the liquid crystal display panel and sequentially outputting scan signals to gate lines formed in the liquid crystal display panel.

7. The apparatus of claim 6, wherein the user connecting part comprises:
    a first input terminal for receiving the power voltage;
    a plurality of second input terminals for receiving the image signals formatted in analog type from the external host system;
    a plurality of third input terminals for receiving the image signals formatted in digital type from the external host system; and
    a first integrated type connector having a plurality of output ports, for providing the power voltage and the image signals formatted in the analog and digital types from the external host system to the liquid crystal display module though the plurality of output ports.

8. The apparatus of claim 6, wherein the liquid crystal display module comprises:
    an interfacing printed circuit board having a second integrated type connector, for receiving the power voltage, the image signals and control signals, outputting a backlight power voltage through a first terminal thereof and outputting image data and gate signal though a second terminal thereof;
    a driving printed circuit board for converting the image data into an analog format, providing the image data to the data lines and sequentially providing the gate signal to the gate lines; and a backlight inverter for providing a power voltage to a lamp in response to the backlight power voltage.

9. The apparatus of claim 6, wherein the liquid crystal display module comprises:

an interfacing printed circuit board having a second integrated type connector, for receiving the power voltage, the image signals and control signals, outputting a backlight power voltage through a first terminal thereof, outputting image data through a second terminal thereof and outputting a gate signal through a third terminal thereof;

a data driving printed circuit board for converting the image data into an analog format and providing the image data to the data lines;

a gate driving printed circuit board for sequentially providing the gate signal to the gate lines; and a backlight inverter for providing a power voltage to a lamp in response to the backlight power voltage.

10. The apparatus of claim 9, wherein the interfacing printed circuit board further comprises a memory for storing a program supplied from the external host system.

11. The apparatus of claim 6, wherein the liquid crystal display module comprises:

an integrated printed circuit board having a second integrated type connector, for receiving the power voltage, the image signals and control signals, outputting a backlight power voltage through a first terminal thereof; converting the image data into an analog format and providing the image data to the data lines though a second terminal thereof and sequentially providing the gate signal to the gate lines through a third terminal thereof; and a backlight inverter for providing a power voltage to a lamp in response to the backlight power voltage.

12. The apparatus of claim 6, wherein the liquid crystal display module comprises:

an integrated printed circuit board having a second integrated type connector, for receiving the power voltage, the image signals and control signals, outputting a backlight power voltage through a first terminal thereof, converting the image data into an analog format and providing the image data and a scan signal that sequentially selects the image data to the gate lines through a second terminal thereof and a backlight inverter for providing a power voltage to a lamp in response to the backlight power voltage.

13. The apparatus of claim 12, wherein the integrated printed circuit board comprises a memory for storing a program supplied from the external host system.

14. The apparatus of claim 6, wherein the second integrated type connector is coupled with the first integrated type connector in a docking manner which is attachable and detachable between the second and first integrated type connectors.

15. The apparatus of claim 14, wherein the first integrated type connector is connected to the user connecting part by means of a predetermined flexible cable.

16. The apparatus of claim 6, wherein the first integrated type connector has a plug shape and the second integrated type connector has a socket shape.

17. The apparatus of claim 6, wherein the first integrated type connector comprises an input port for receiving a predetermined program from an external host system, and the second integrated type connector further comprises an output port for outputting the program to the printed circuit board.

* * * * *